June 14, 1938.  W. JENSEN ET AL  2,120,671
MOWING MACHINE ATTACHMENT FOR TRACTORS
Filed Aug. 17, 1936   2 Sheets-Sheet 1

INVENTORS
WILLIAM JENSEN
HARRY JENSEN
BY
*David Chaness*
ATTORNEY

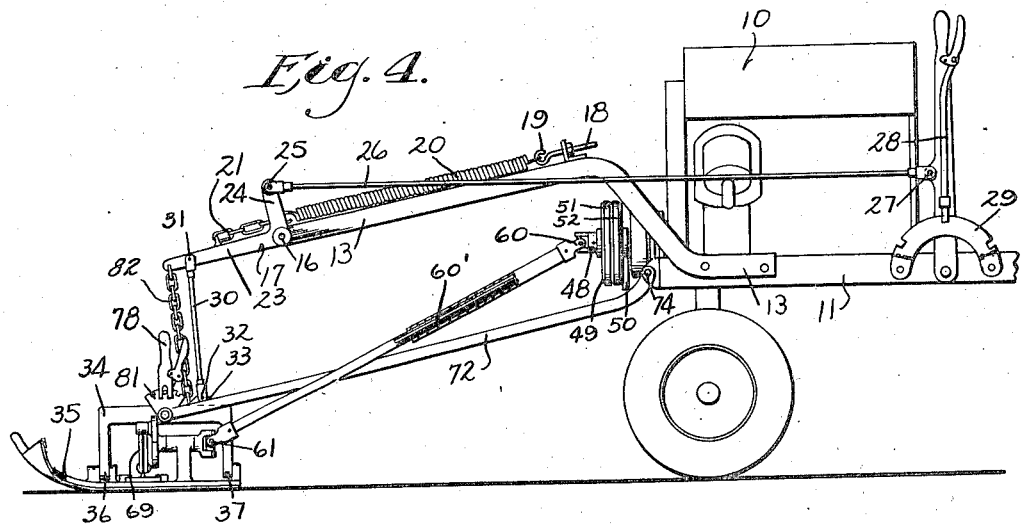
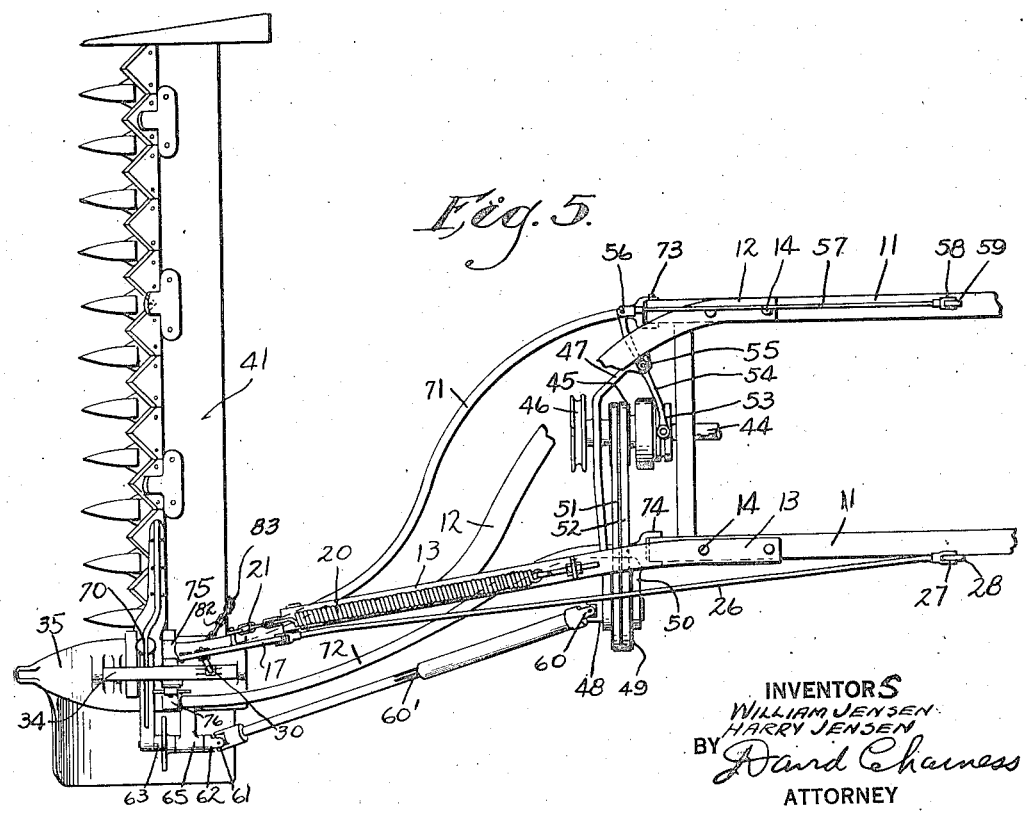
INVENTORS
WILLIAM JENSEN
HARRY JENSEN
BY
ATTORNEY

Patented June 14, 1938

2,120,671

UNITED STATES PATENT OFFICE 2,120,671

MOWING MACHINE ATTACHMENT FOR TRACTORS

William Jensen and Harry Jensen, Hales Corners, Wis.

Application August 17, 1936, Serial No. 96,360

6 Claims. (Cl. 56—25)

This invention relates to improvements in mowing machine attachments for tractors.

An object of the invention is to provide a device of the type which may be attached to and suspended from a tractor so as to be projecting directly forwardly thereof in its path.

Another object of the invention is to so dispose the mowing attachment as to obviate preliminary crushing of the vegetation to be mowed.

Another object of the device is to provide a mower which will utilize the greatest possible percentage of the strength of the power plant actuating it.

Other and further objects of the invention will appear as the description proceeds, reference being had to the accompanying drawings in which:—

Fig. 4 is a side view in elevation similar to Fig. 1.

Fig. 5 is a plan view of the mower shown attached to the tractor frame.

Figure 1:
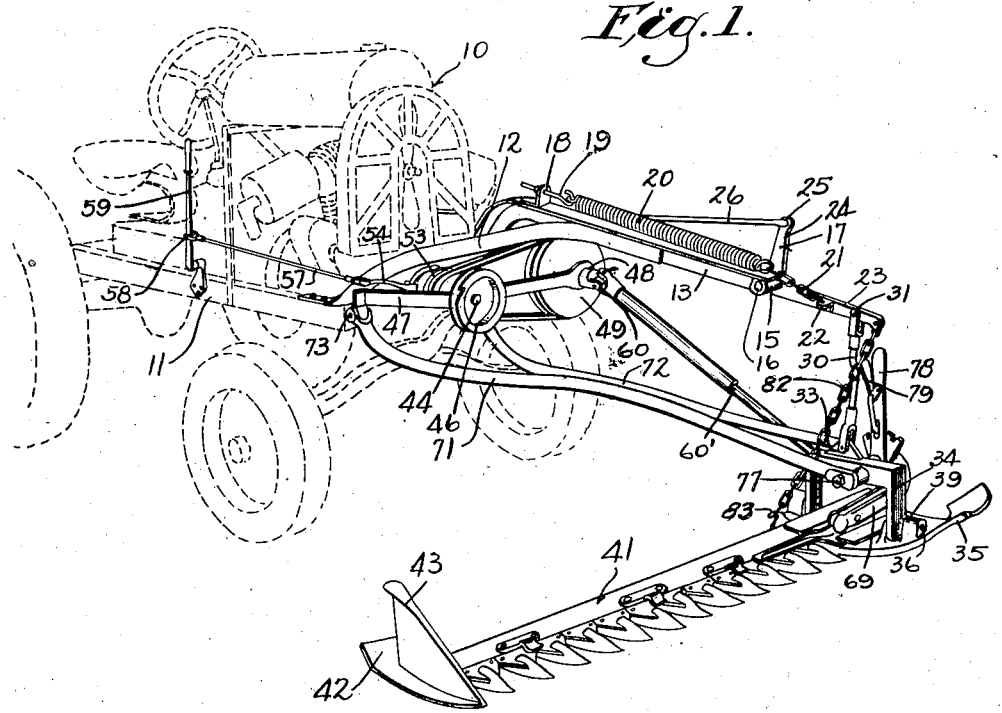
Fig. 1 is a view in perspective of a mowing device embodying my invention.
Figure 2:
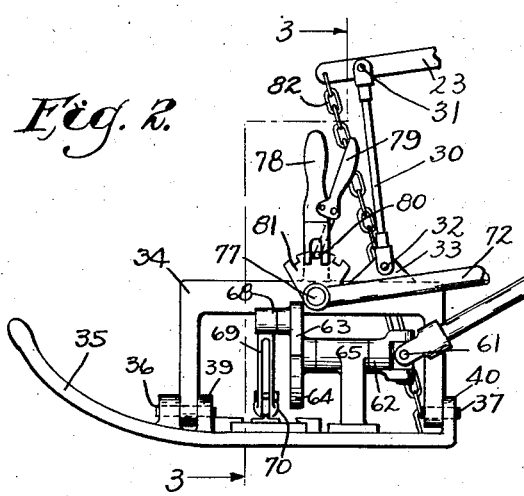
Fig. 2 is a fragmentary end view in elevation of the device.
Figure 3:
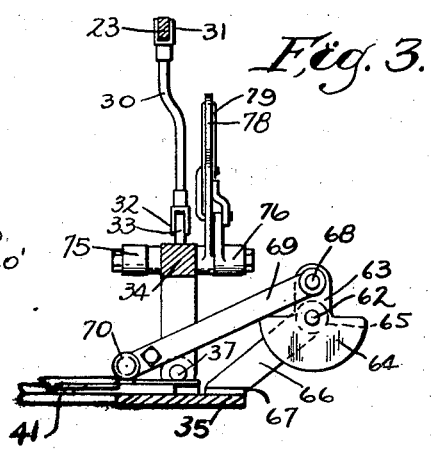
Fig. 3 is a fragmentary front view in elevation of the cutter actuating mechanism.

Referring more particularly to the drawings, the numeral 10 represents a conventional tractor having a frame 11, to which is attached at the front end thereof, a pair of support bars, 12 and 13, fixedly secured to said frame by rivet or other means 14. The support 13 extends forwardly and slightly outwardly to one side of the frame 11. The support 12 extends forwardly and curvedly across to join and underlie, for a portion of its length, the support 13.

At the far end of support 13, and subjoined thereto, is a sleeve 15 which carries the spindle 16 of the bell crank 17. On the top and rearwardly of the support 13 is the bracket 18 in which is held the hook 19, in turn holding the coiled tension spring 20 which latter is connected at its forward end to the chain 21 secured to bracket 22 in the long arm 23 of the bell crank 17. The upwardly extending short arm 24 of the bell crank 17 is pivotally connected at 25 thereof with a connecting rod 26, which latter is pivotally connected at its other end at 27 thereof with a hand lever 28 which may be positioned by means of a conventional notched quadrant 29. Depending from the long arm 23 of bell crank 17 is a connecting rod 30, pivotally connected at 31 as shown and also at 32 to an upwardly extending ear 33 of the hanger 34. A skid 35 is swiveled to said hanger 34 by means of pins 36 and 37 held respectively in bearings 39 and 40. The skid 35 has affixed thereto a mower unit of conventional design 41, having affixed to its other end the skid 42 and upstanding guard 43. The tractor 10 has the usual motor crank shaft 44, and has attached thereto the sheave 45, and the starter pulley 46. A brace 47 journals the crank shaft 44 and the shaft 48 carrying the sheave 49 outwardly to one side of the bar 13 by means of the brace 47 forwardly thereof, and brace 50 rearwardly thereof attached to frame 11. The sheave 45 is rotatively connected with the sheave 49 by means of belts 51 and 52. A clutch mechanism 53 is actuated by means of a lever 54 pivoted at 55 of brace 47 and pivotally connected at 56 with the connecting rod 57, in turn pivotally connected at 58 with the hand lever 59. The shaft 48 is connected by means of a universal joint 60 with a splined shaft 60' which latter is connected at its lower end by means of the universal joint 61 with shaft 62 bearing the crank 63 and the counterweight 64. The shaft 64 is supported in the sleeve 65 which is integral with the bracket 66 secured by its base portion 67 on the skid 35. The crank 62 is connected at 68 with connecting rod 69 pivotally attached at 70 with a conventional toothed cutter of the mower device. Attached to frame 11 are the supports, 71 and 72, pivoted thereto at 73 and 74 respectively, and attached at their lower ends by means of sleeves 75 and 76 to the shaft 77. A hand lever 78 is fixed to the hanger 34 and has a conventional grip 79 adapted to actuate a pin 80 for engaging a toothed quadrant 81 fixed to the bar 72. A chain 82 is attached to the forward end of the long arm 23 of bell crank 17, and extends from that point to a hook 83, attached to member 41, for the purpose of supporting the mower unit in horizontal alignment. When the bell crank is tilted backwardly, this action causes a tension on the chain 82 in such manner as to incline upwardly the mower unit 41.

In operation, the tractor 10 is driven toward the plot of vegetation to be mowed and the mowing attachment 41 is properly directed and pitched by means of lever 78, depending upon the roughness of the ground over which it is to travel. By pulling on the lever 58, the clutch means 53 will connect the crank shaft 44 to operate the sheave 45, thus conducting the power through sheave 49 and shaft 60' to the crank 63, and thus through connecting rod 69 to the mower device 41.

If obstructions are encountered, the mower 41 may be lifted by pulling backwardly on lever 28 until the obstruction has been passed. In going to and from jobs of mowing, the lever 28 may be used to pull the mower away from the ground and by means of the quadrant 29 it may be so held.

The invention is capable of many modifications in structure and design without departing from the spirit of the invention, all within the scope of the appended claims.

Having thus described our invention what we claim and desire to secure by Letters Patent of the United States, is:—

1. In combination with the frame of a tractor upwardly and forwardly extending rigid means for suspending a mower, a bell crank interposed between said rigid means and said mower, spring means connected with said rigid means and said bell crank to normally support the latter at a given level, and lower hinged support means extending between said frame and said mower.

2. In combination with the frame of a tractor upwardly and forwardly extending rigid means for suspending a mower, a manually operable bell crank interposed between said rigid means and said mower, spring means connected with said rigid means and said bell crank to normally support the latter at a given level, and lower hinged support means extending between said frame and said mower.

3. In combination with the frame of a tractor upwardly and forwardly extending rigid means for suspending a mower, a manually retractable bell crank interposed between said rigid means and said mower, spring means connected with said rigid means and said bell crank to normally support the latter at a given level, and lower hinged support means extending between said frame and said mower.

4. In a device of class described, upwardly and forwardly extending rigid means for suspending a mower, elevating means interposed between said rigid means and said mower, hinged support means extending between the base of said rigid means and said mower, and lever means attached to said mower and engageable with means on said flexing means to vary the pitch of the mower.

5. In a device of class described, a frame, upwardly and forwardly extending rigid means for suspending a mower, hinged means extending between said frame and said mower beneath the rigid means, elevating means interposed between said rigid means and said mower, manual means for actuating said elevating mechanism extending between the base of said rigid means and said mower, and lever means attached to said mower and engageable with means on said flexing means to vary the pitch of the mower.

6. In combination with a tractor having a conventional power plant, rigid means extending upwardly and forwardly for suspending a mower in the path thereof, manually operable bell crank means interposed between said rigid means of the mower, spring means on said rigid means connected with the bell crank for sustaining the latter at a given level, a connecting shaft between said bell crank and said mower, hinged support means extended between the base of said rigid means and the mower, clutch means connected with said power plant, a sheave connected with said clutch, plurality of belts connecting the latter with a sidewardly extending sheave, a universal jointed splined shaft and a counterbalanced crank connecting said shaft and the mower.

WILLIAM JENSEN.
HARRY JENSEN.